(12) United States Patent
Wong et al.

(10) Patent No.: US 7,280,347 B2
(45) Date of Patent: Oct. 9, 2007

(54) UNIVERSAL BATTERY PACK

(75) Inventors: Hong W. Wong, Portland, OR (US);
Wah Yiu Kwong, Beaverton, OR (US);
Don J. Nguyen, Portland, OR (US);
Shawn S. McEuen, Portland, OR (US);
George H. Daskalakis, Forest Grove, OR (US); Daryl J. Nelson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 11/025,574

(22) Filed: Dec. 29, 2004

(65) Prior Publication Data

US 2006/0139859 A1    Jun. 29, 2006

(51) Int. Cl.
*G06F 1/16* (2006.01)
(52) U.S. Cl. ............... 361/679; 429/90; 312/223.1; 711/112
(58) Field of Classification Search ............... 429/90; 73/866.1; 439/74; 312/223.1–223.2; 361/679–687, 361/724–727; 711/112
See application file for complete search history.

(56) References Cited

U.S. PATENT DOCUMENTS

| | | | |
|---|---|---|---|
| 5,216,371 A | 6/1993 | Nagai | |
| 5,271,152 A | 12/1993 | Murphy | |
| 5,700,151 A * | 12/1997 | Korsunsky et al. | 439/74 |
| 6,781,826 B1 * | 8/2004 | Goldstone et al. | 361/685 |
| 6,894,893 B2 * | 5/2005 | Hidesawa | 361/683 |
| 6,918,311 B2 * | 7/2005 | Nathan | 73/866.1 |
| 7,019,420 B2 * | 3/2006 | Kogan et al. | 307/150 |
| 2003/0082441 A1 * | 5/2003 | Hovi et al. | 429/123 |
| 2003/0143455 A1 * | 7/2003 | Partington et al. | 429/97 |
| 2005/0233205 A1 * | 10/2005 | Koike | 429/90 |
| 2005/0233206 A1 * | 10/2005 | Puttaiah et al. | 429/120 |

FOREIGN PATENT DOCUMENTS

| | | |
|---|---|---|
| EP | 0562723 A2 | 9/2003 |
| WO | WO95/31012 | 11/1995 |

OTHER PUBLICATIONS

PCT Search Report, PCT/US2005/037166, mailed Feb. 21, 2006.

* cited by examiner

*Primary Examiner*—Hung Van Duong
(74) *Attorney, Agent, or Firm*—Blakely, Sokoloff, Taylor & Zafman LLP (57) ABSTRACT

According to one embodiment, a system is disclosed. The system includes a chassis including a printed circuit board (PCB) and a battery pack. The battery pack includes a connector to enable the battery pack to couple to a PCB which is mounted either above the centerline of the battery pack connector and on or below the centerline of the battery pack power connector.

11 Claims, 15 Drawing Sheets

UNIVERSAL BATTERY PACK

FIELD OF THE INVENTION

The present invention relates to computer systems; more particularly, the present invention relates to dissipating heat generated while providing power to a computer system.

BACKGROUND

Mobile computer systems, such as notebook computers, include one or more battery packs to provide power to the system whenever a permanent power source is not available. Generally, each computer system vendor provides a specific design for the battery pack implemented for its particular system. In some instances, there are different battery pack designs for two or more systems provided by the same vendor. As a result, it is currently not possible to use a battery pack designed for one computer system in another system.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A universal battery pack is described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
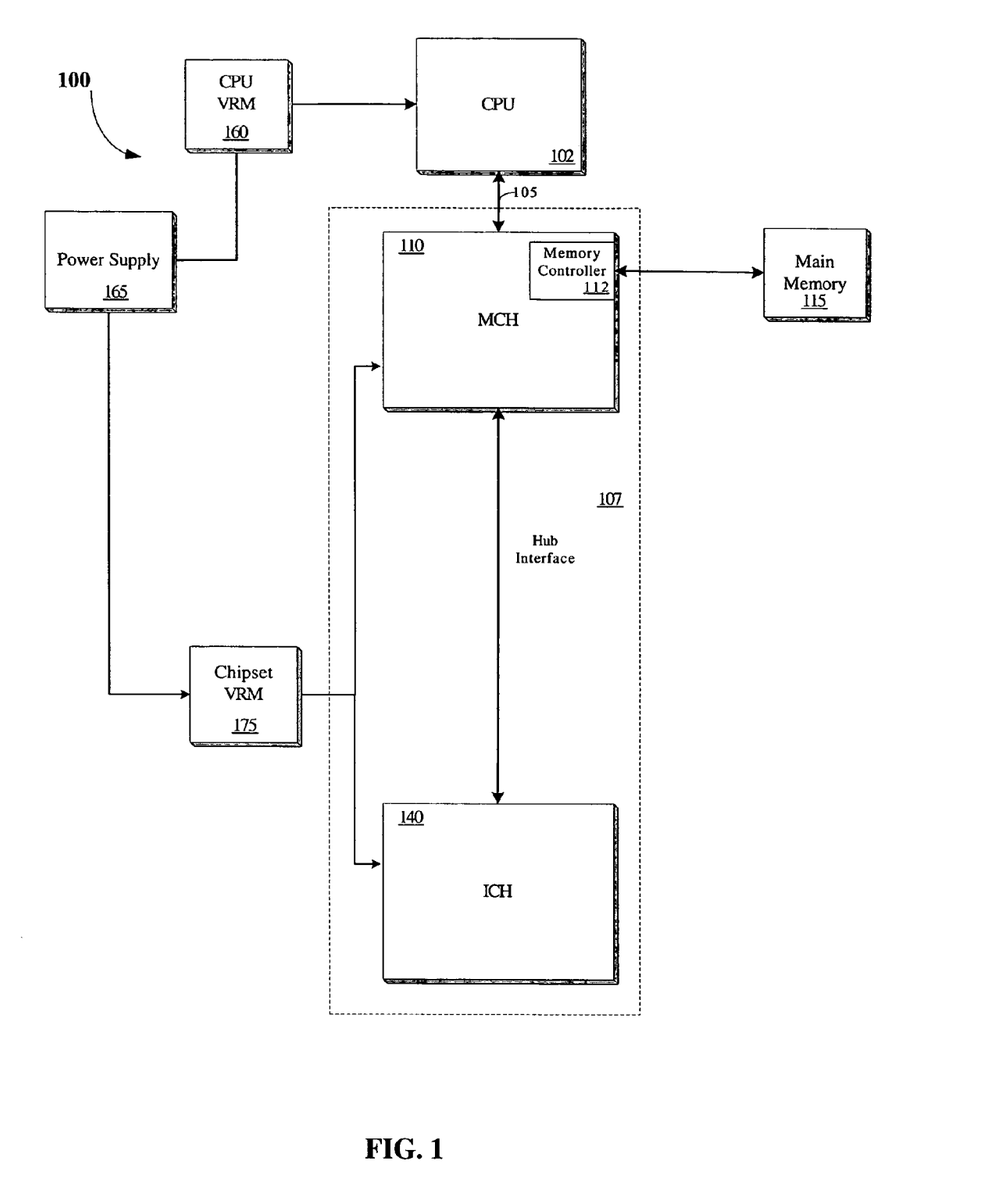
FIG. 1 is a block diagram of one embodiment of a computer system.

FIG. 1 is a block diagram of one embodiment of a computer system 100. According to one embodiment, computer system is a mobile computer system (e.g., a laptop, or notebook computer). Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to bus 105, such as multiple CPUs and/or multiple system memories.

MCH 110 is coupled to an input/output control hub (ICH) 140 via a hub interface. ICH 140 provides an interface to input/output (I/O) devices within computer system 100. In addition, computer system 100 includes a power supply 165 and a multitude of voltage regulators that are used to provide power to various components within computer system 100.

CPU voltage regulator module (VRM) 160 provides voltage to CPU 102. VRM 175 supplies voltage for both MCH 110 and ICH 140 within chipset 107.

Figure 2:
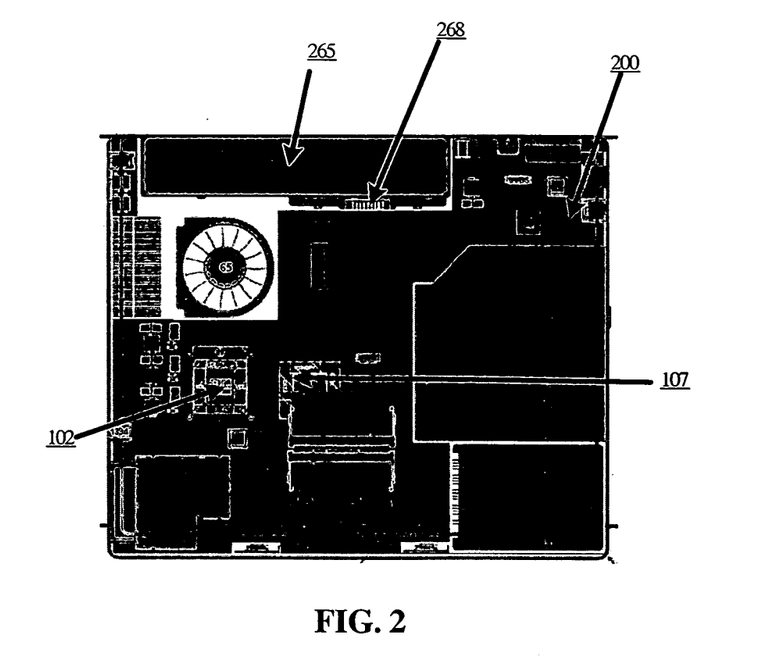
FIG. 2 illustrates a top view of one embodiment of a computer system motherboard.
Figure 3:
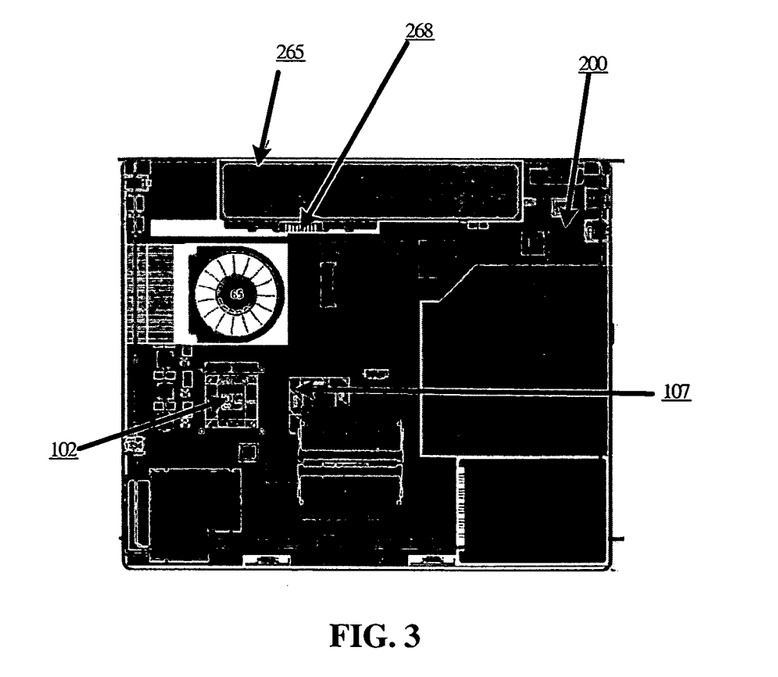
FIG. 3 illustrates another a top view of another embodiment of a battery pack.

FIGS. 2 and 3 illustrate a top view of one embodiment of computer system 100 in a motherboard 200 layout for a mobile computer system. Motherboard 200 is a printed circuit board (PCB) that includes the basic circuitry and IC components of computer system 100 mounted thereon. For instance, motherboard 200 includes CPU 102 and chipset 107.

In addition, motherboard 200 includes a battery pack 265 and a battery connector 268. Battery pack 265 represents the power supply 165 that provides power to the components of motherboard 200. According to one embodiment, battery pack 265 is a universal battery pack that is capable of being inserted and secured with a multitude of mobile computer system designs utilizing universal mechanical features.

Battery Pack Connector

Connector 268 serves as an interface between battery pack 265 and motherboard 200 where the battery pack 265 power is provided to motherboard 200. Connector 268 may be either a male or female connector with the appropriate opposite connector on motherboard 200.

As shown in FIG. 2 and FIG. 3, battery pack 265 may be reversed and flipped to accommodate different motherboard 200 designs. However, there are also computer system designs where the clearance between the motherboard and the bottom of the chassis is variable. For instance, there are some designs where the motherboard sits atop the base of the chassis, e.g., the motherboard is on or below the center line of the power connector of the battery pack; and others where the motherboard sits close to the system keyboard, which the motherboard is on or above the center line of the power connector of the battery pack. To accommodate the different designs, a battery pack is to include a connector that may couple with the motherboard regardless of location.

Figure 4:
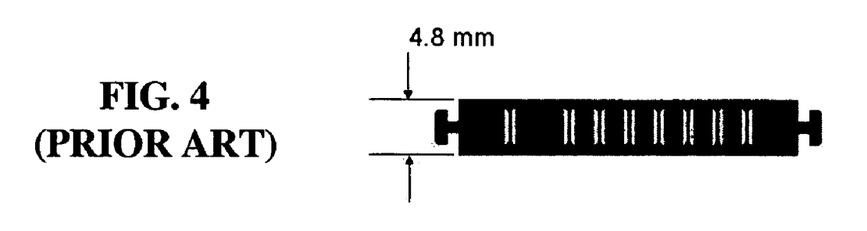
FIG. 4 illustrates a conventional battery pack connector.

FIG. 4 illustrates a conventional connector. As shown in FIG. 4, this conventional connector is 4.8 mm in height, which would preclude accommodating the different designs with varying motherboard mounting heights. According to one embodiment, a connector 268 is provided that enables battery pack 265 to couple with motherboard 200 regardless of placement.

Figure 5:
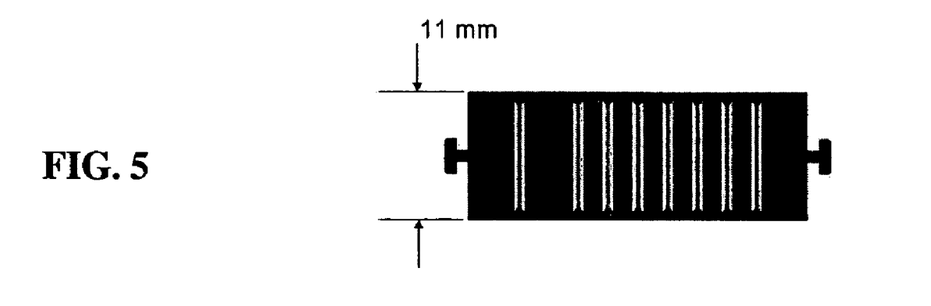
FIG. 5 illustrates one embodiment of a battery pack connector.
Figure 6:
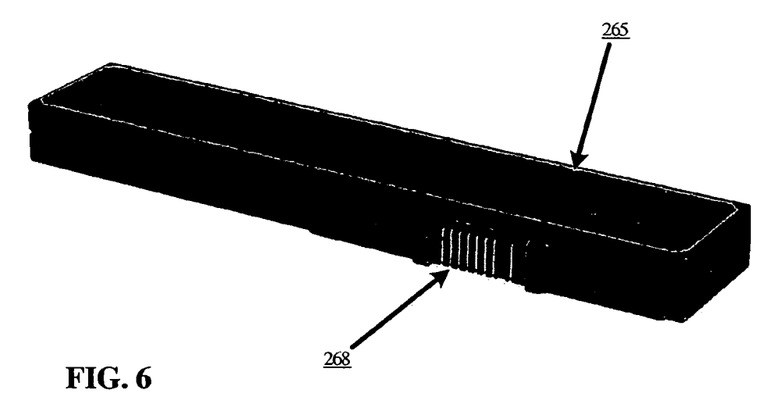
FIG. 6 illustrates a top view of one embodiment of a battery pack connector.

FIG. 5 illustrates one embodiment of a connector 268. Connector 268 includes an extended-length "wipe contact" that enables battery pack 265 to fit into systems which have different mounting heights and associated varying clearances between motherboard 200 to the base of the chassis. FIG. 6 illustrates one embodiment of battery pack 265 having a wipe contact connector 268. According to one embodiment, connector 268 has a height of 11 mm.

Figure 7:
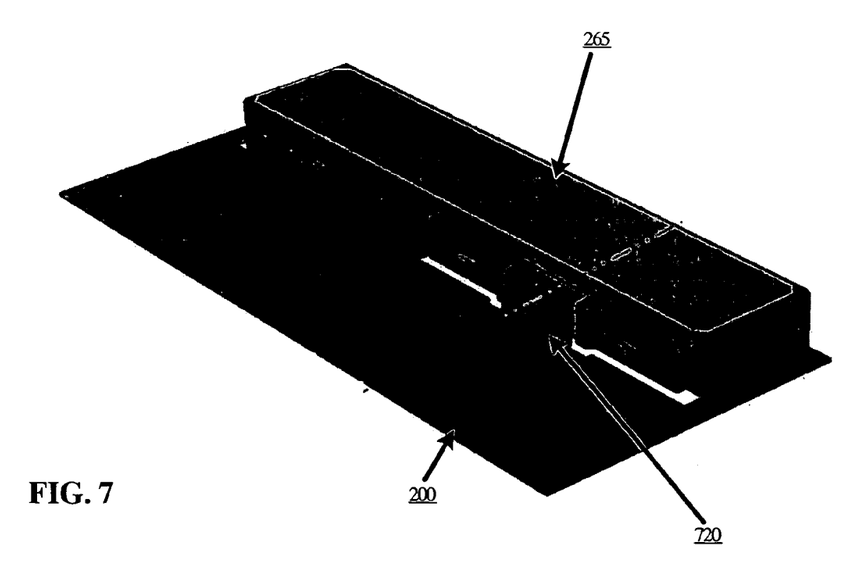
FIG. 7 illustrates a view of one embodiment of a battery pack connector implemented to couple a battery pack to a motherboard.

FIG. 7 illustrates another embodiment of battery pack 265 where the wipe contact component is mounted on motherboard 200 as a motherboard connector 720. In such an embodiment, connector 268 has a fixed blade design. Consequently, the wipe contact size of the connector on motherboard 200 can be optimized to the specific system.

Figure 8:
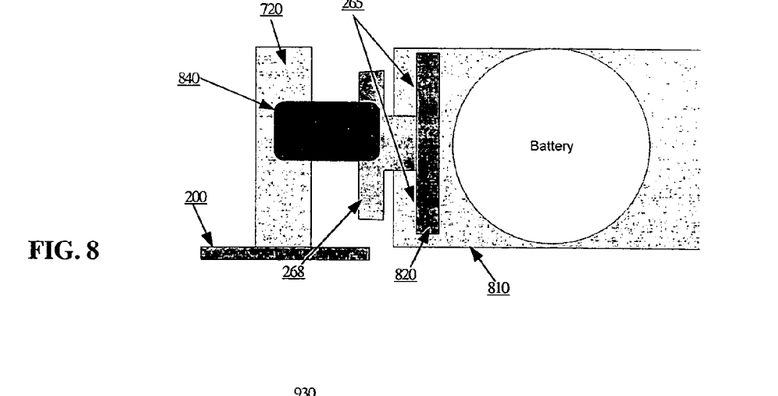
FIG. 8 illustrates a side view of another embodiment of a battery pack connector implemented to couple a battery pack to a motherboard.

FIG. 8 illustrates a side view of one embodiment of a battery pack 265 coupled to a motherboard 200 via connector 268. In such an embodiment, connector 268 is coupled to battery housing 810 via a battery controller board 820. In a further embodiment, connector 268 has a "T" contact shape, which allows space for components and/or routing on the battery controller board 820. Connector 268 is coupled to motherboard 200 via a power blade 840. Power blade 840 is in turn coupled to a motherboard connector 720, which is coupled to motherboard 200.

Figure 9:
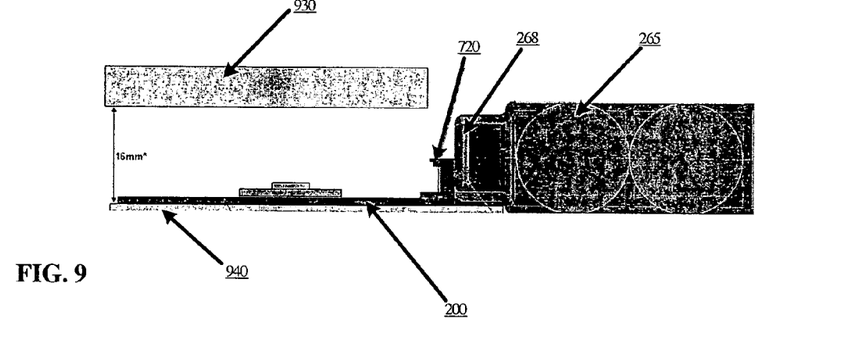
FIG. 9 illustrates one embodiment of a battery pack with connector.
Figure 10:
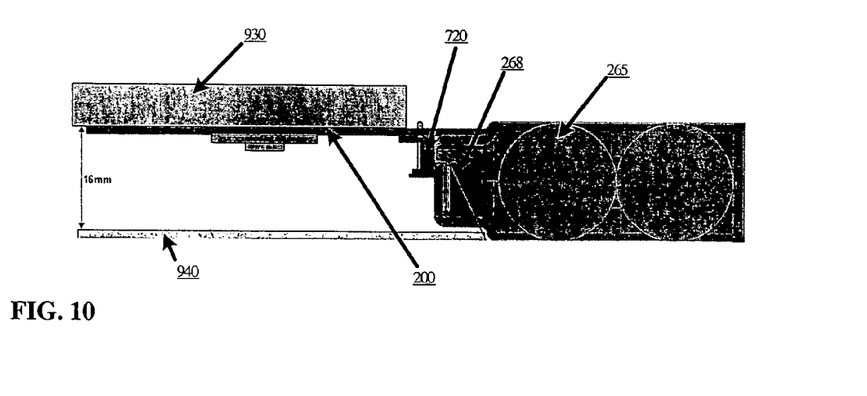
FIG. 10 illustrates one embodiment of a battery pack with connector coupled to a motherboard.

FIG. 9 illustrates a side view of one embodiment of battery pack 265 coupled to a motherboard 200 via connector 268. In the embodiment shown in FIG. 9, motherboard 200 is mounted on a baseboard 940 via connectors 268 and 720, while keyboard 930 is located on top. FIG. 10 illustrates a side view of another embodiment of battery pack 265 coupled to a motherboard 200 via connector 268. In the embodiment shown in FIG. 10, motherboard 200 is mounted on top with keyboard 930 via connectors 268 and 720.

Figure 11:
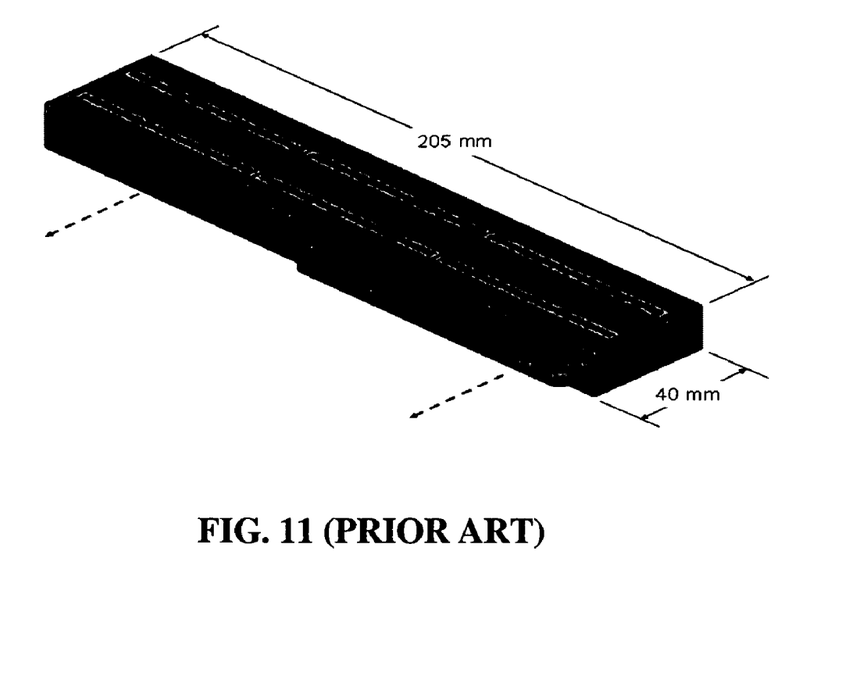
FIG. 11 illustrates a conventional battery pack.
Figure 12:
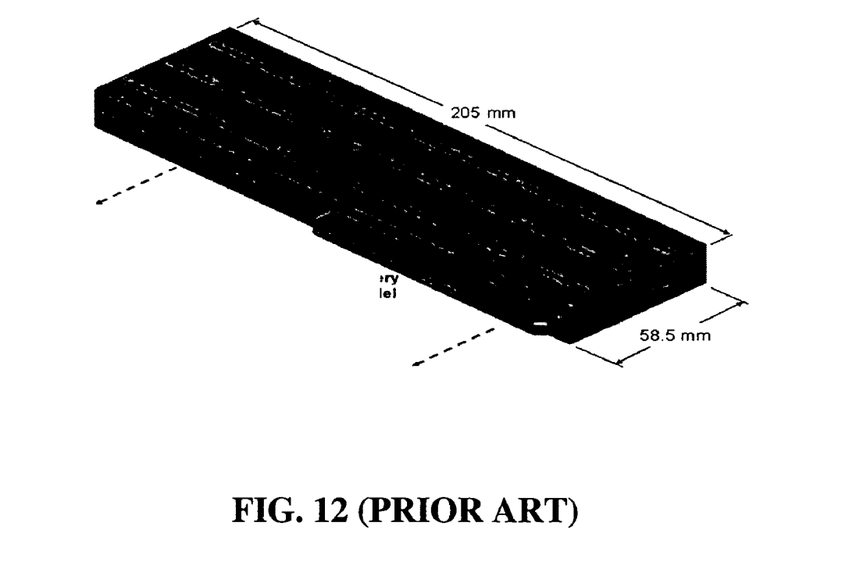
FIG. 12 illustrates a conventional battery pack.

The above-described connector enables a universal battery pack to mate to mobile systems designed by different vendors. Thus, the connector supports system design with different spacing between the baseboard and the base of the chassis, enables the battery to be mounted in the front part of the system and allows the battery to be installed in different orientations for system design differentiation Battery Pack Cell Alignment FIGS. 11 and 12 illustrate conventional battery packs. These packs are rear plug-in battery packs that align cylindrical or prismatic battery cells parallel (or end-to-end) with the back of the chassis that the battery pack is mounting to minimize the extension of the battery out of the back-end of the chassis.

However, a negative aspect of such a design is that it consumes maximum peripheral space along the back of the chassis. In some cases for lower power densities, the battery pack fits within the chassis with no protrusion. Typically the battery pack is designed with two or three cells parallel in series such that the cells are in parallel with the system chassis (depending on the targeted chassis form factor). There are two rows of three cells shown in FIG. 11 which is a six cell battery pack. Depending on the required overall power density of the battery pack, there are one, two, or three rows of batteries in the battery pack. A nine cell pack is shown in FIG. 12. Note that the length of each of the designs is 205 mm.

Figure 13:
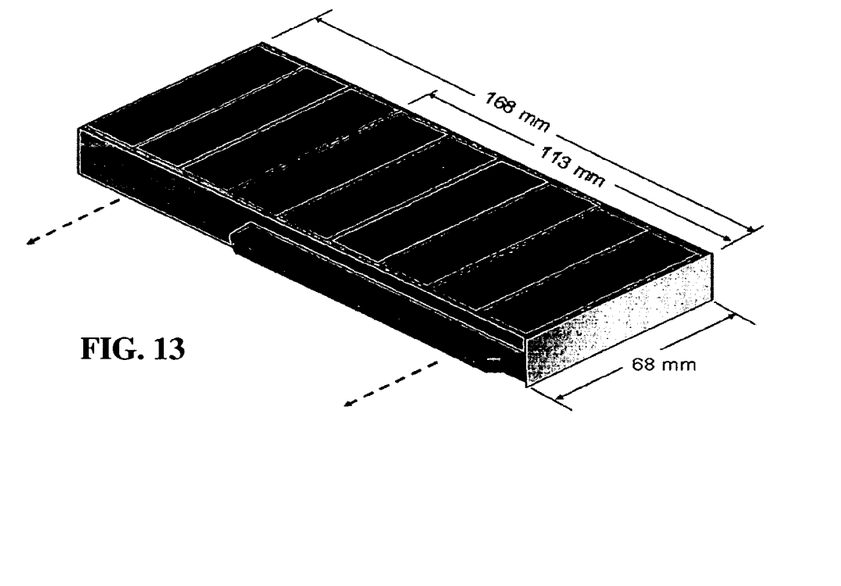
FIG. 13 illustrates one embodiment of a battery pack.

According to one embodiment, a universal battery pack 265 includes battery cells that are oriented within the pack perpendicular to the back of the chassis. Thus, the cells are mounted side-by-side. FIG. 13 illustrates one embodiment of battery pack 265. As shown in FIG. 13, battery pack 265 includes a nine cell design that has a length that is less than (e.g., 168 mm to 205 mm) the six cell design of conventional packs, which leaves space for additional battery packs, or mobile system designs.

Figure 14:
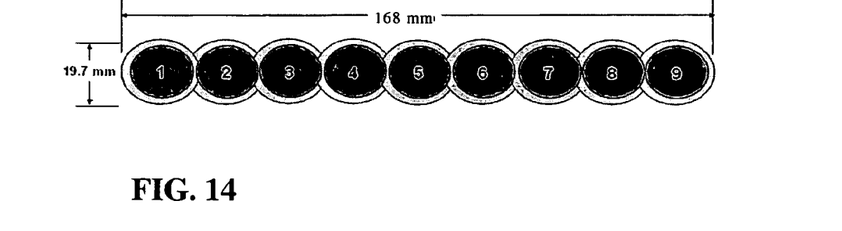
FIG. 14 illustrates one embodiment of battery cells.
Figure 15:
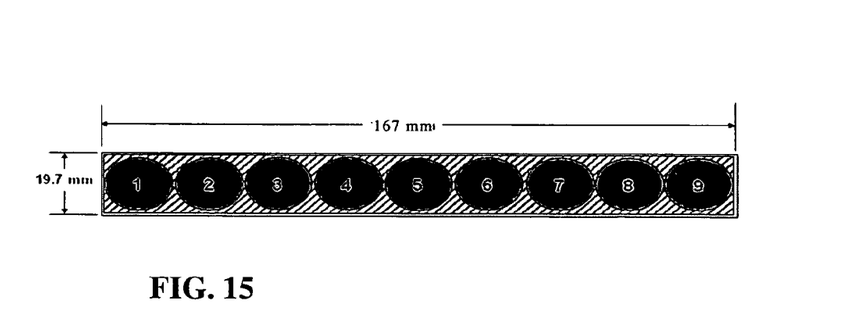
FIG. 15 illustrates another embodiment of battery cells.

FIG. 14 illustrates one embodiment of a battery pack cells. In such an embodiment, thermally conductive material is included between the cells to conduct heat from within the chassis or from the charging of the batteries to the exterior of the chassis. FIG. 15 illustrates another embodiment of a battery pack cells. In this embodiment, a design is disclosed to reduce weight and pack material.

Figure 16:
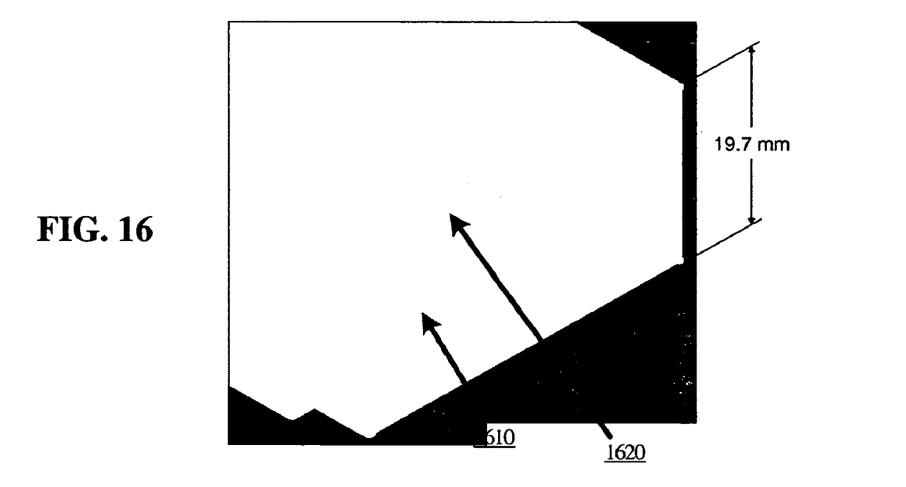
FIG. 16 illustrates a cross section of one embodiment of a battery pack with battery cells.
Figure 17:
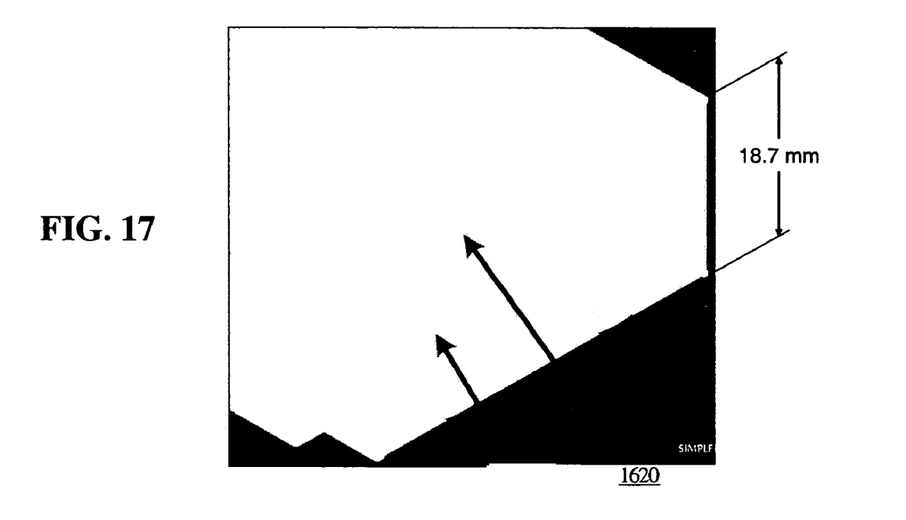
FIG. 17 illustrates a cross section of another embodiment of a battery pack with battery cells.
Figure 18:
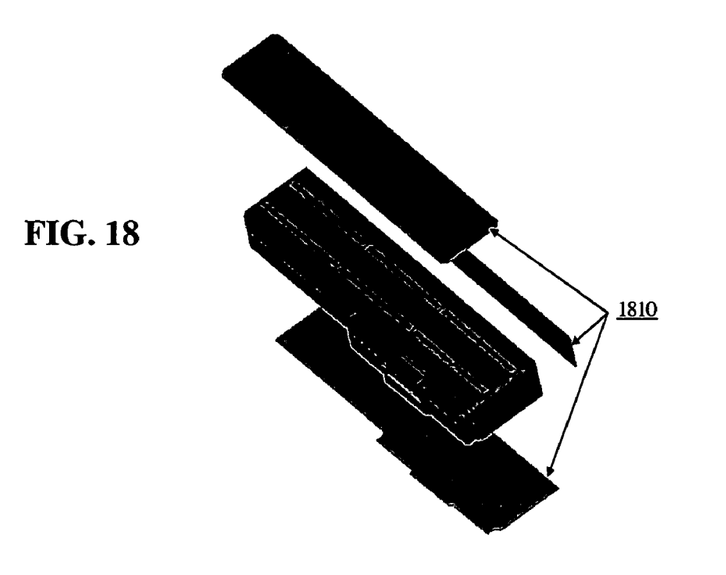
FIG. 18 illustrates another embodiment of a battery pack.
Figure 19:
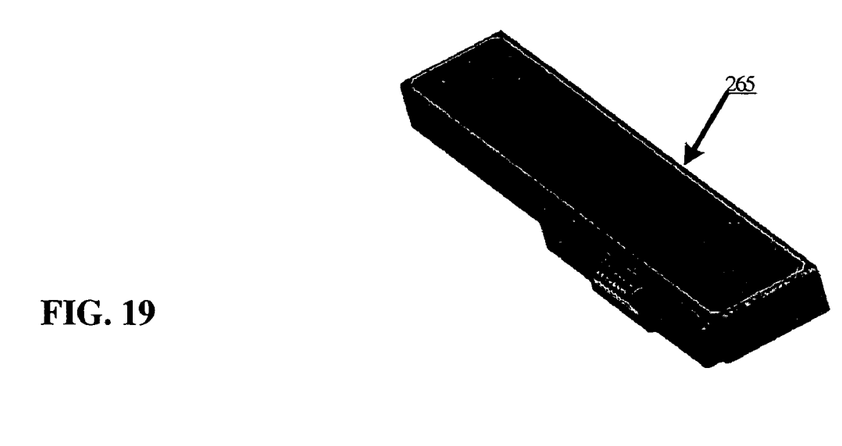
FIG. 19 illustrates yet another embodiment of a battery pack.

In addition, additional packaging designs may be included to reduce the size of battery pack 265. FIG. 16 illustrates a cross section of one embodiment of battery pack 265 with battery cells 1610. This embodiment illustrates a reduced housing 1620 thickness. FIG. 17 illustrates a cross section of another embodiment of battery pack 265. In this embodiment, housing 1620 has an even further reduced thickness, such that cells 1610 are exposed. According to one embodiment, the exposed portions may be covered with one or more adhesive labels. FIGS. 18 and 19 illustrate another embodiment of battery pack 265 with adhesive labels.

Battery Pack Latching Mechanisms

To enable universal battery pack 265 to be interchangeable amongst different systems, common points/areas to which battery pack 265 will attach to the system are available. Also, to enable multiple systems, these features accommodate the use of the battery in different designs. For example, if battery pack 265 is to be installed into a system from the bottom, a different latching mechanism is to be implemented than for installation into a rear loading system.

Figure 20:
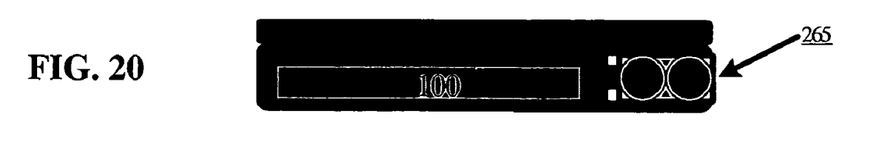
FIG. 20 illustrates one embodiment of a computer system with a battery pack.

FIG. 20 illustrates one embodiment of a computer system 100. In this embodiment, battery pack 265 is installed from the rear of system 100, which is not exposed at the bottom of the system. Thus, pack 265 uses a latch to keep from sliding out the rear. No other support is required since the system itself provides this support. This latching can be achieved by simply locking onto recess or protrusions (discussed below) that restrict the sliding motion.

Figure 21:
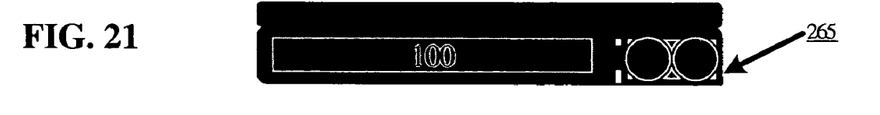
FIG. 21 illustrates another embodiment of a computer system with a battery pack.

FIG. 21 illustrates another embodiment of a computer system 100. In this embodiment, battery pack 265 is installed from the bottom and rear of system 100. As a result, features that will support pack 265, as well as locking it into place, are implemented to keep pack 265 from sliding out. This latching and support is achieved with features that positively engage the system 100 to keep battery pack 265 from falling out while latches lock onto recesses or protrusions to restrict sliding motion.

Figure 22:
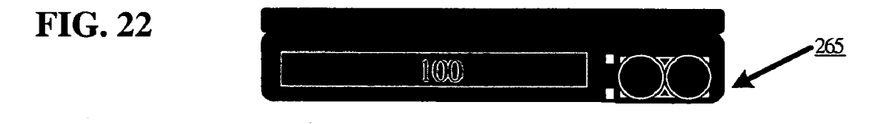
FIG. 22 illustrates yet another embodiment of a computer system with a battery pack.

FIG. 22 illustrates yet another embodiment of a computer system 100. In this embodiment, battery pack 265 is installed from the bottom of a system 100. Consequently, pack 265 implements only features for support, and no features that restrict sliding motion. This support may be achieved with features that positively engage the notebook system to keep the battery from falling out while.

Figure 23:
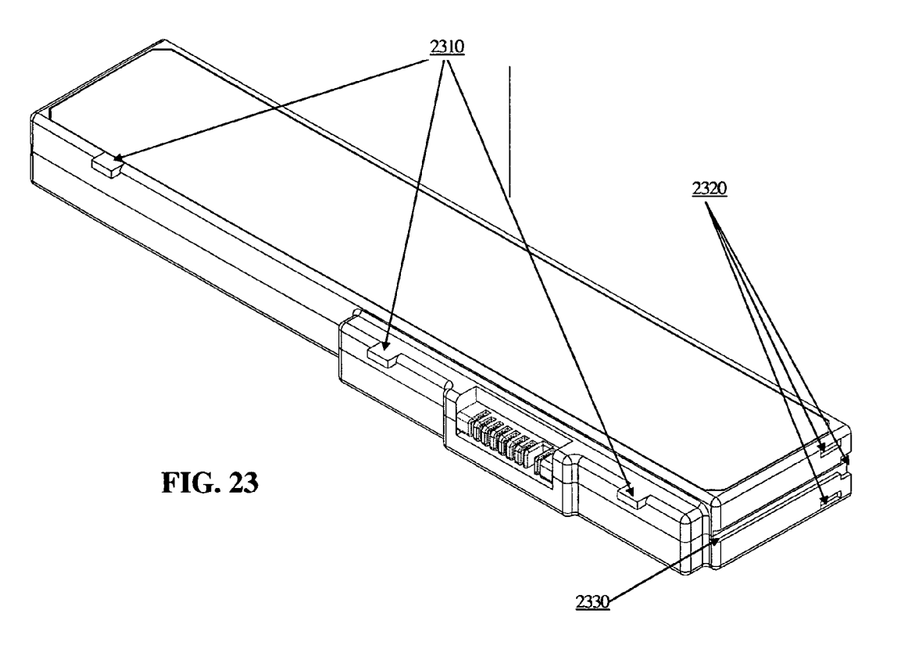
FIG. 23 illustrates another embodiment of a battery pack.

FIG. 23 illustrates one embodiment of a batter pack 265 implementing latching and support features. In one embodiment, protrusions 2310 are implemented as positive engaging points in bottom loading systems. In such embodiments, protrusions 2310 are inserted into openings in the system at an angle while battery pack 265 is rotated into place. Protrusions 2310 may also be implemented in rear loading, and bottom and rear loading systems as additional alignment support.

According to one embodiment, recess features 2320 on either side of battery pack 265 provide areas for latches in the system to engage pack 265 to restrict sliding in rear loading, and bottom and rear loading systems. In addition, recess features may be used for bottom loading systems. Female rail 2330 supports battery pack 265 in bottom and rear loading systems by interfacing with a male rail feature in the system. Female rail 2330 may also be used as a catch in bottom loading systems if used with a spring latch.

Battery Pack Cover

Since a universal battery pack 265 may be used in various different systems, the color of battery pack 265 may not match the color of the computer system. Therefore, a cover may be implemented for the purpose of covering the battery pack to hide the different color.

Figure 24:
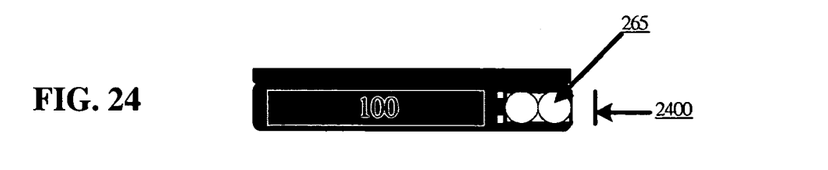
FIG. 24 illustrates one embodiment of a computer system with a battery pack cover.
Figure 25:
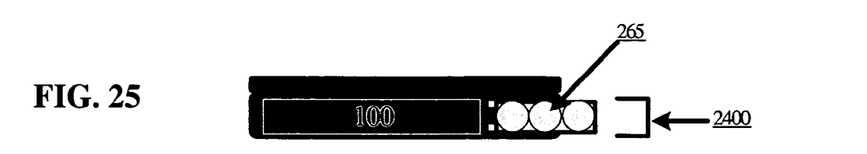
FIG. 25 illustrates another embodiment of a computer system with a battery pack cover.

FIG. 24 illustrates one embodiment of a computer system 100 with a battery pack cover 2400. In this embodiment, cover 2400 is flat to cover battery pack 265 in a rear loading system. FIG. 25 illustrates another embodiment of computer system 100 with battery pack cover 2400. In this embodiment, cover 2400 includes extensions to cover battery pack 265 in a rear loading system where battery pack 265 protrudes from the system.

Figure 26:
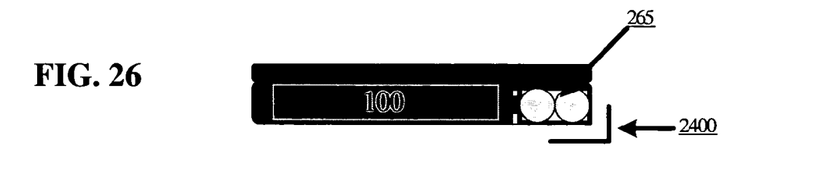
FIG. 26 illustrates yet another embodiment of a computer system with a battery pack cover.

FIG. 26 illustrates yet another embodiment of computer system 100 with battery pack cover 2400. In this embodiment, cover 2400 includes an "L" shape to cover battery pack 265 in a bottom and rear loading system.

Figure 27:
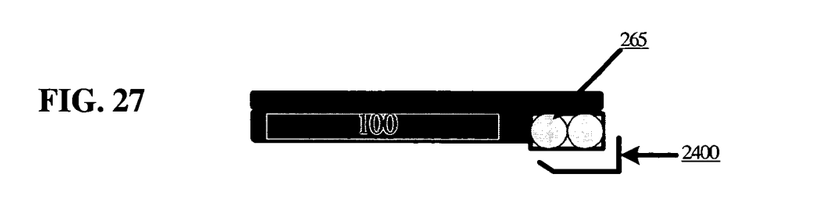
FIG. 27 illustrates still another embodiment of a computer system with a battery pack cover.

FIG. 27 illustrates another embodiment of computer system 100 with battery pack cover 2400. In this embodiment, system 100 is thinner than those shown FIGS. 24-26. Thus battery pack 265 protrudes outside the base of system 100. The bottom and the rear surface of battery pack 265 can be covered with a cover 2400 to protect the battery and also provide a unified industrial design for system 100.

Figure 28:
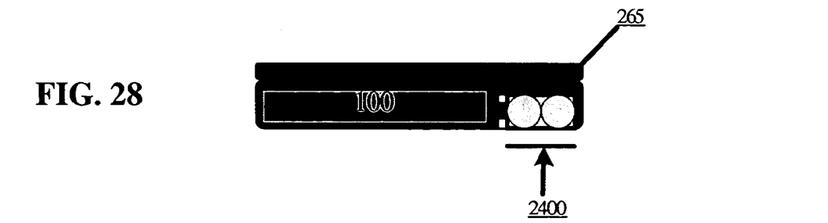
FIG. 28 illustrates a further embodiment of a computer system with a battery pack cover.
Figure 29:
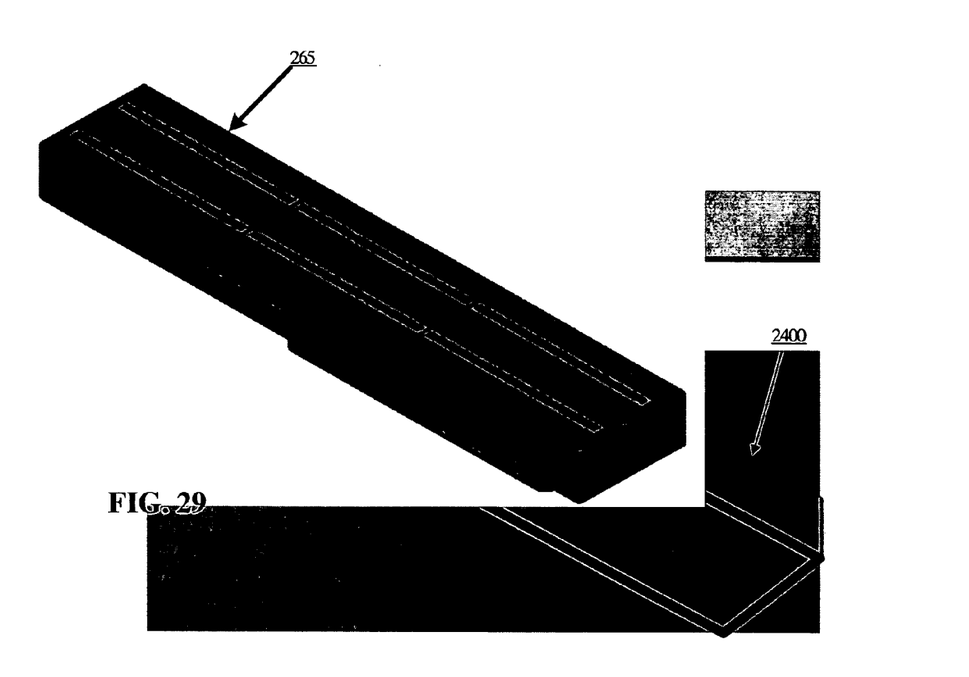
FIG. 29 illustrates a further embodiment of a battery pack with a battery pack cover.

FIG. 28 illustrates still a further embodiment of computer system 100 with battery pack cover 2400. In this embodiment, cover 2400 is flat to cover battery pack 265 in a bottom loading system 100. FIG. 29 illustrates one embodiment of a battery pack cover 2400.

Removable and Adjustable Battery Pack Protrusions

As discussed above, computer systems implement various types of battery pack loading (e.g., rear, bottom, etc.). In these systems battery pack 265 may be inserted into different systems at different angles. These systems include rails in the chassis to accommodate the sliding in of a battery pack 265. According to one embodiment, battery pack 265 includes protrusions that are removable and adjustable to match the rails in the various system chassis insertion mechanisms.

Figure 30:
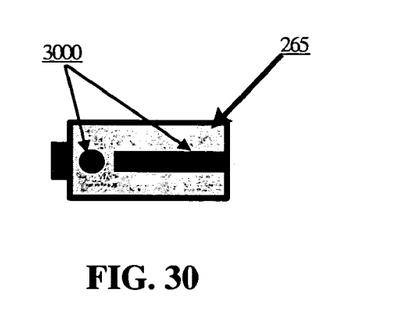
FIG. 30 illustrates one embodiment of a battery pack with protrusions.
Figure 31:
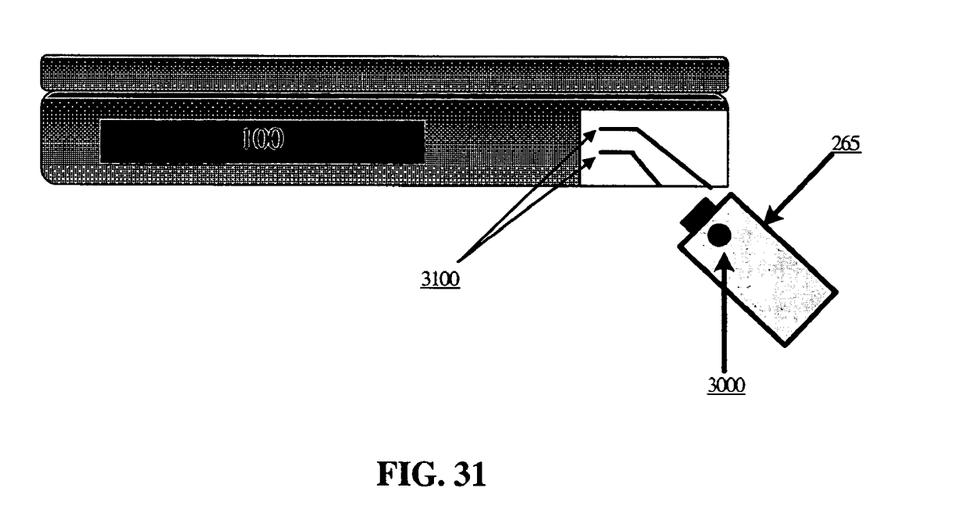
FIG. 31 illustrates one embodiment of a battery pack with protrusions inserted into a computer system.

FIG. 30 illustrates one embodiment of a battery pack 265 with protrusions 3000. In one embodiment, protrusions 3000 include circular and straight protrusions on each side of pack 265. FIG. 31 illustrates one embodiment of a battery pack 265 with protrusions 3000 inserted into a computer system 100. In this embodiment, the straight component is removed so that the circular component engages rails 3100 in the chassis of system 100, which is a rear and bottom loading system.

Figure 32:
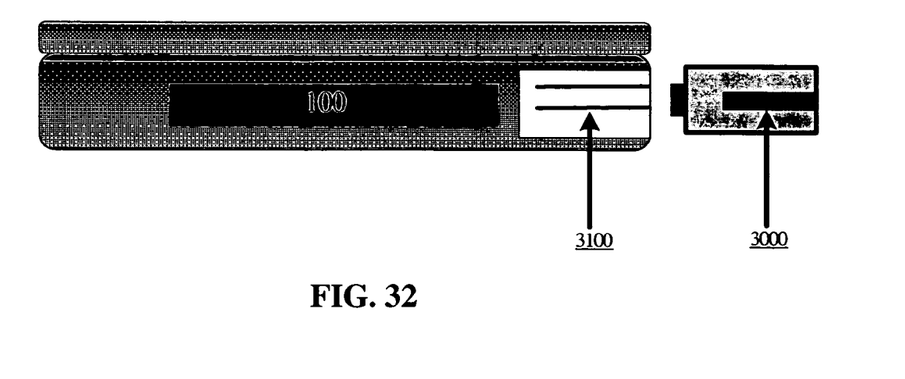
FIG. 32 illustrates another embodiment of a battery pack with protrusions inserted into a computer system.

FIG. 32 illustrates another embodiment of battery pack 265 with protrusions 3000 inserted into a computer system 100. In this embodiment, the circular component is removed so that the straight component engages rails 3100 in the chassis of system 100, which is a rear loading system.

Figure 33:
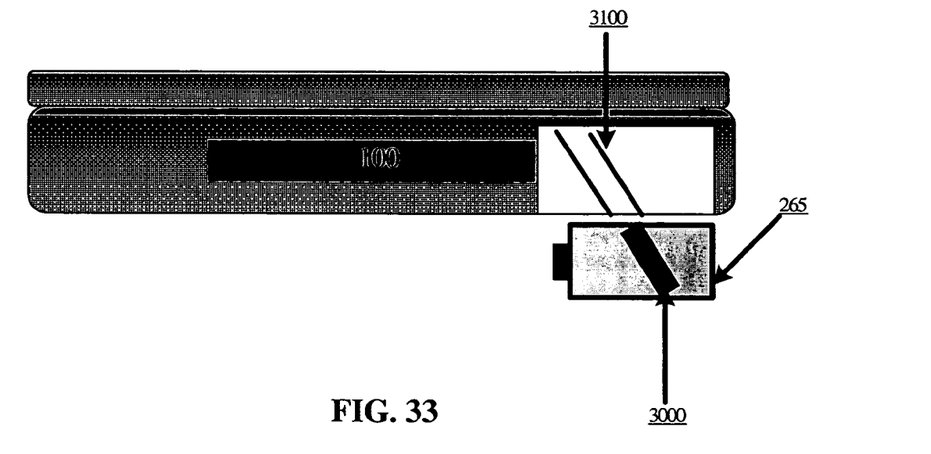
FIG. 33 illustrates yet another embodiment of a battery pack with protrusions inserted into a computer system.

FIG. 33 illustrates yet another embodiment of battery pack 265 with protrusions 3000 inserted into a computer system 100. In this embodiment, the circular component is removed and the straight component is adjusted to engage rails 3100 in a bottom loading system.

The above-described universal battery pack includes features that enable a common battery pack to be utilized by multiple platforms.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A system comprising:
    a chassis including:
        a printed circuit board (PCB);
        a battery pack having a connector to enable the battery pack to couple to the PCB if the PCB is mounted at the top of the chassis and if the PCB is mounted bottom of the chassis;
        a keyboard mounted at the top of the chassis; and
        a baseboard mounted at the bottom of the chassis.

2. The system of claim 1 wherein the PCB is mounted below the keyboard.

3. The system of claim 1 wherein the PCB is mounted above the base of the chassis.

4. The system of claim 1 wherein the connector comprises a "T" contact shape.

5. The system of claim 4 wherein the connector is coupled to the PCB via a power blade.

6. A system comprising:

a chassis having an opening; and a battery pack having;

one or more engagement points to enable the battery pack to be loaded into a bottom opening in the chassis;

one or more recess components to latch the battery pack into the housing when loaded from a rear opening in the chassis; and a rail support to support the battery pack when loaded from a rear and bottom opening in the chassis.

7. The system of claim 6 further comprising a cover to cover the battery pack when the battery pack is installed in the opening.

8. The system further of claim 7 wherein the cover is used to cover a bottom opening in the chassis.

9. The system further of claim 7 wherein the cover is used to cover a rear opening in the chassis.

10. The system further of claim 7 wherein the cover is to cover a bottom and rear opening in the chassis.

11. The system further of claim 6 further comprising one or more protrusions that are adjustable to enable the battery pack to be inserted into rear, bottom, and bottom and rear openings in the chassis.

* * * * *